(12) United States Patent
Jones-McFadden et al.

(10) Patent No.: US 9,749,308 B2
(45) Date of Patent: Aug. 29, 2017

(54) SYSTEM FOR ASSESSING NETWORK AUTHENTICATION REQUIREMENTS BASED ON SITUATIONAL INSTANCE

(71) Applicant: Bank of America Corporation, Charlotte, NC (US)

(72) Inventors: Alicia C. Jones-McFadden, Fort Mill, SC (US); Joseph Neil Johansen, Rock Hill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 132 days.

(21) Appl. No.: 14/987,577

(22) Filed: Jan. 4, 2016

(65) Prior Publication Data

US 2017/0195307 A1    Jul. 6, 2017

(51) Int. Cl.
H04L 29/06    (2006.01)

(52) U.S. Cl.
CPC ............ *H04L 63/08* (2013.01); *H04L 63/083* (2013.01); *H04L 63/102* (2013.01); *H04L 63/105* (2013.01)

(58) Field of Classification Search
CPC ........................................... H04L 63/08
See application file for complete search history.

(56) References Cited

U.S. PATENT DOCUMENTS

| 5,655,004 A * | 8/1997 | Holbrook | H04W 12/12 455/411 |
|---|---|---|---|
| 7,071,113 B2 | 7/2006 | Kim et al. | |
| 7,600,676 B1 | 10/2009 | Rados et al. | |
| 7,707,120 B2 | 4/2010 | Dominguez et al. | |
| 7,769,991 B2 | 8/2010 | Niemelä | |
| 7,899,753 B1 | 3/2011 | Everhart | |
| 8,087,085 B2 | 12/2011 | Hu et al. | |
| 8,195,576 B1 | 6/2012 | Grigg et al. | |

(Continued)

FOREIGN PATENT DOCUMENTS

GB         401015 A    11/1933

OTHER PUBLICATIONS

Rocha et al.; A2BeST: An adaptive authentication service based on mobile user's behavior and spatio-temporal context; Published in: Computers and Communications (ISCC), 2011 IEEE Symposium on; Date of Conference: Jun. 28-Jul. 1, 2011; 2011; IEEE Xplore.*

(Continued)

*Primary Examiner* — Bradley Holder
(74) *Attorney, Agent, or Firm* — Michael A. Springs; Moore & Van Allen PLLC; W. Kevin Ransom

(57) ABSTRACT

Embodiments of the invention are directed to a system, method, or computer program product for assessing network authentication requirements based on situational instance. In this regard, the invention dynamically determines specific user authentication requirements for accessing a service or executing an activity based on the determining the user's network connections, geographic location, and applications, in real-time. The invention provides a novel method for employing activity data provided by a plurality of users associated with historical activity information to vary the authentication requirements dynamically. Another aspect of the invention is directed to constructing geographic maps with predefined physical areas and overlaying graphical representations of activity data on the maps, in real-time.

18 Claims, 8 Drawing Sheets

(56) References Cited

U.S. PATENT DOCUMENTS

| | | |
|---|---|---|
| 8,312,545 B2 | 11/2012 | Tuvell et al. |
| 8,341,749 B2 | 12/2012 | Rogel |
| 8,346,666 B2 | 1/2013 | Lindelsee et al. |
| 8,355,982 B2 | 1/2013 | Hazel et al. |
| 8,380,177 B2 | 2/2013 | Laracey |
| 8,522,039 B2 | 8/2013 | Hyndman et al. |
| 8,572,391 B2 | 10/2013 | Golan et al. |
| 8,595,491 B2 | 11/2013 | Nice et al. |
| 8,635,157 B2 | 1/2014 | Smith et al. |
| 8,713,684 B2 | 4/2014 | Bettini et al. |
| 8,782,792 B1 | 7/2014 | Bodke |
| 8,819,772 B2 | 8/2014 | Bettini et al. |
| 8,844,038 B2 | 9/2014 | Niemelä |
| 8,863,279 B2 | 10/2014 | McDougal et al. |
| 8,904,525 B1 | 12/2014 | Hodgman et al. |
| 8,984,632 B1 | 3/2015 | Laffoon et al. |
| 9,058,607 B2 | 6/2015 | Ganti et al. |
| 9,064,115 B2 | 6/2015 | Tuvell et al. |
| 9,069,957 B2 | 6/2015 | Tuvell et al. |
| 9,104,871 B2 | 8/2015 | Tuvell et al. |
| 9,143,529 B2 | 9/2015 | Qureshi et al. |
| 9,363,278 B2 | 6/2016 | Maria |
| 9,654,982 B2 | 5/2017 | Bank et al. |
| 2006/0021003 A1 | 1/2006 | Fisher et al. |
| 2006/0073811 A1* | 4/2006 | Ekberg ............... H04L 63/0807 455/411 |
| 2006/0123465 A1 | 6/2006 | Ziegler |
| 2009/0254975 A1* | 10/2009 | Turnbull ............. H04L 63/0492 726/3 |
| 2009/0265775 A1* | 10/2009 | Wisely ............... H04L 63/0492 726/9 |
| 2010/0051685 A1 | 3/2010 | Royyuru et al. |
| 2010/0125495 A1 | 5/2010 | Smith et al. |
| 2011/0047597 A1 | 2/2011 | Mahaffey et al. |
| 2011/0145920 A1 | 6/2011 | Mahaffey et al. |
| 2012/0197740 A1 | 8/2012 | Grigg et al. |
| 2012/0265631 A1 | 10/2012 | Cronic et al. |
| 2013/0023240 A1* | 1/2013 | Weiner ................. H04W 12/06 455/411 |
| 2013/0226800 A1 | 8/2013 | Patel et al. |
| 2013/0232542 A1* | 9/2013 | Cheng ................. G06F 21/6218 726/1 |
| 2013/0275303 A1 | 10/2013 | Fiore et al. |
| 2013/0282588 A1 | 10/2013 | Hruska |
| 2013/0347100 A1* | 12/2013 | Tsukamoto ........... H04L 9/3226 726/19 |
| 2014/0372308 A1 | 12/2014 | Sheets |
| 2015/0220907 A1* | 8/2015 | Denton ................ G06Q 20/322 705/44 |
| 2016/0173508 A1 | 6/2016 | Kozlovsky et al. |
| 2016/0180322 A1* | 6/2016 | Song ..................... G06Q 40/00 705/44 |

OTHER PUBLICATIONS

Xiong et al.; A spatial entropy-based approach to improve mobile risk-based authentication; Published in: Proceeding GeoPrivacy '14 Proceedings of the 1st ACM SIGSPATIAL International Workshop on Privacy in Geographic Information Collection and Analysis Article No. 3; 2014; ACM Digital Library.*

Meyer, Roger. Secure Authentication on the Internet (Apr. 4, 2007). Retrieved online Mar. 27, 2012. http://www.sans.org/reading_room/whitepapers/securecode/secure-authentication-internet_2084. 36 pps.

* cited by examiner

SYSTEM FOR ASSESSING NETWORK AUTHENTICATION REQUIREMENTS BASED ON SITUATIONAL INSTANCE

FIELD OF THE INVENTION

The present invention is directed to dynamic assessment and variation of authentication requirements for electronic user activities, based on the type of the user activity, technological parameters of devices used to conduct the activity and situational instance of the user activity. Furthermore, the present invention embraces a novel, proactive approach to safeguarding user information.

BACKGROUND

Over the last few years, there has been a significant increase in the number of electronic activities, particularly online and mobile activities due to widespread use of smartphone, tablet computers, laptop computers and electronic computing devices in general. Therefore, identifying and preventing unauthorized exposure of users' electronic information, and ensuring the security of electronic activities is crucial. While it may not be feasible to perpetually ascertain the veracity of the multitude of network devices/networks, device locations and applications stored on the devices associated with all electronic activities, the present invention provides a novel method of employing historical data to identify potential exposure and mitigate potential exposure by dynamically escalating authentication requirements, in real-time.

The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a system, method and computer program product for assessing network authentication requirements based on situational instance, a corresponding method, and computer program product. The system provides a dynamic platform for determining authentication requirements in real-time. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below. In one embodiment, the system is configured to: establish an operative communication link with a mobile device associated with a user; receive, from the mobile device, a request to execute a user activity, wherein the user activity requires validation of one or more authentication credentials; monitor user network connections, user location, and user applications associated with the mobile device during the user activity; extract activity data regarding historical exposure events, wherein the activity data is received from a plurality of users associated with the historical exposure events; compare the user network connections, the user location and the user applications with the activity data; escalate, in real-time, a level of authentication required for the user to execute the user activity based on determining that (i) the user network connections, (ii) the user location, and/or (iii) the user applications are associated with a historical exposure event; present the escalated authentication requirement to the user via the mobile device; and enable the user to execute the user activity based on receiving a positive authentication response.

In another embodiment, and in combination with the previous embodiment, the system is further configured to: determine device information associated with the mobile device; identify at least one local network associated with the mobile device based on the device information, wherein the mobile device is in communication with the at least one local network during the user activity; determine one or more local devices in communication with the at least one local network; and escalate the level of authentication required for the user activity based on determining that the at least one local network and/or the one or more local devices are associated with the historical exposure event.

In another embodiment, and in combination with any of the previous embodiments, the system is further configured to: retrieve, via the operative communication link, application information from the mobile device; determine one or more applications associated with the mobile device, wherein the one or more applications comprise application stored on the mobile device, applications that are currently active and/or applications that are not currently active; and escalate the level of authentication required for the user activity based on determining that at least one of the one or more applications is associated with the historical exposure event.

In another embodiment, and in combination with any of the previous embodiments, the system is further configured to reduce the level of authentication required for the user to execute the user activity based on determining that the user network connections, the user location and the user applications are not associated with the historical exposure event.

In another embodiment, and in combination with any of the previous embodiments, the system is further configured to lock a display of the mobile device until (i) the user network connections, the user location and the user applications are not associated with the historical exposure event or (ii) the positive authentication response is received.

In another embodiment, and in combination with any of the previous embodiments, the system is further configured to: determine whether current user security features meet the escalated authentication requirement for the user activity; determine one or more types of new security features that meet the escalated authentication requirement; and enable the user to modify the current user security features based on the determined new security features.

In another embodiment, and in combination with any of the previous embodiments, the system is further configured to: establish communication links with a plurality of secondary user devices associated with a plurality of secondary users; receive, via the communication links, activity data associated with a plurality of historical exposure events; determine, for each historical exposure event of the plurality of historical exposure events, an event geographic area; construct a dynamic exposure map for display on the mobile device, the map comprising geographic areas associated with the historical exposure events; overlay, for each historical exposure event, a physical graphical element on the dynamic exposure map proximate to the event geographic area; modify, in real-time, one or more display attributes associated with the physical graphical element based on the activity data; and initiate a presentation of the dynamic exposure map on a display associated with the mobile device.

In another embodiment, and in combination with any of the previous embodiments, modifying the one or more display attributes further comprises, for each physical graphical element, modifying the physical graphical element based on a frequency of historical exposure events at the event geographic area associated with the physical graphical element, based on a type of exposure event at the event geographic area associated with the physical graphical element and/or based on a number of exposure events in a predetermined period of time preceding the current time at the event geographic area associated with the physical graphical element.

In another embodiment, and in combination with any of the previous embodiments, the system is further configured to: determine that the user is currently proximate to the event geographic area associated with the historical exposure event; initiate a presentation of the dynamic exposure map on the mobile device, wherein the dynamic exposure map comprises an overlay of the physical graphical element associated with the historical exposure event; and modify one or more display attributes associated with the physical graphical element.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
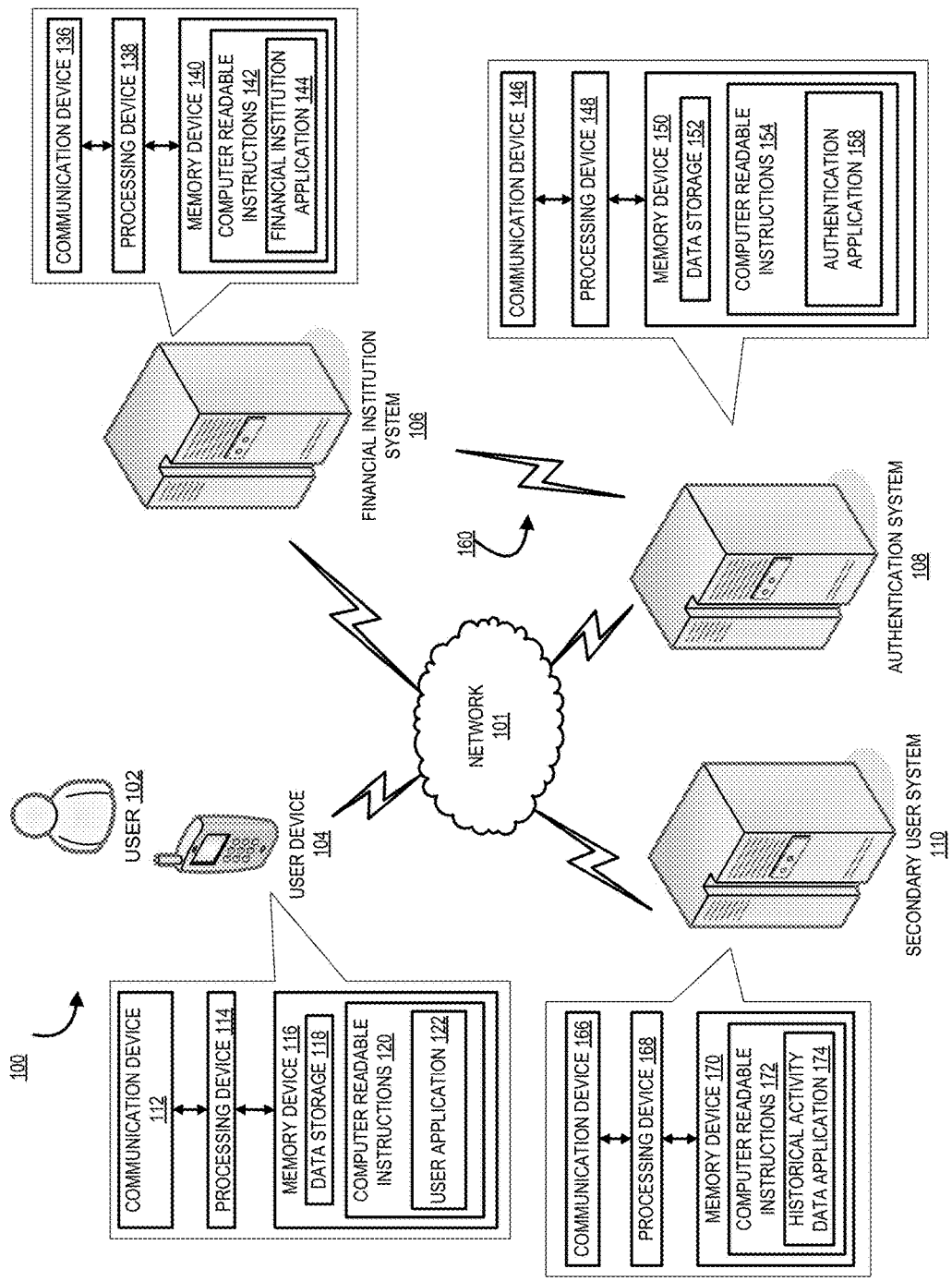
Figure 2:
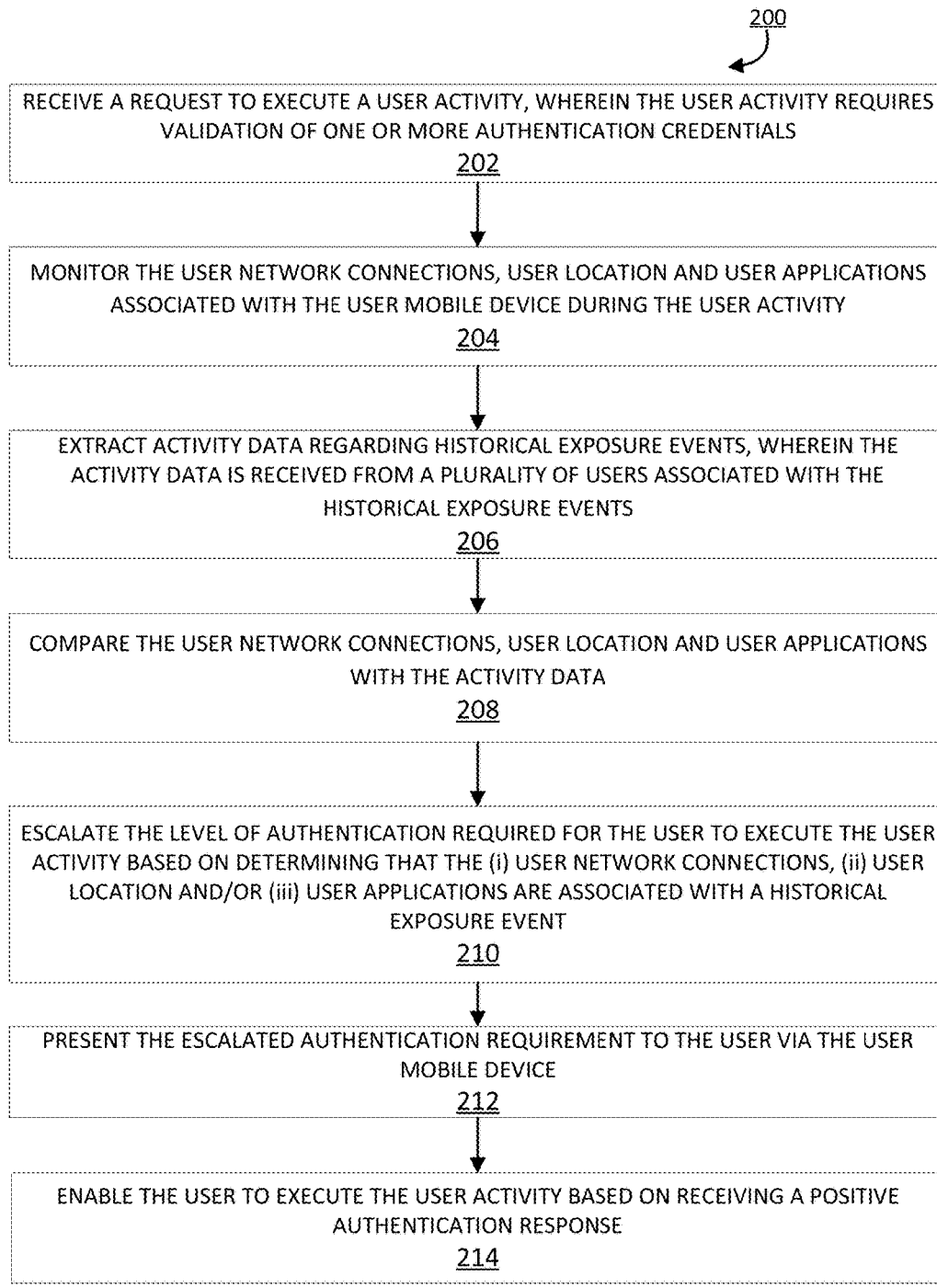

Having thus described embodiments of the invention in general terms, reference will now be made the accompanying drawings, wherein:

FIG. 1 depicts an authentication system and environment in accordance with an aspect of the present invention;

FIG. 2 schematically depicts a high level process flow for escalating authentication requirements based on situational instance in accordance with an aspect of the invention.

Figure 3:
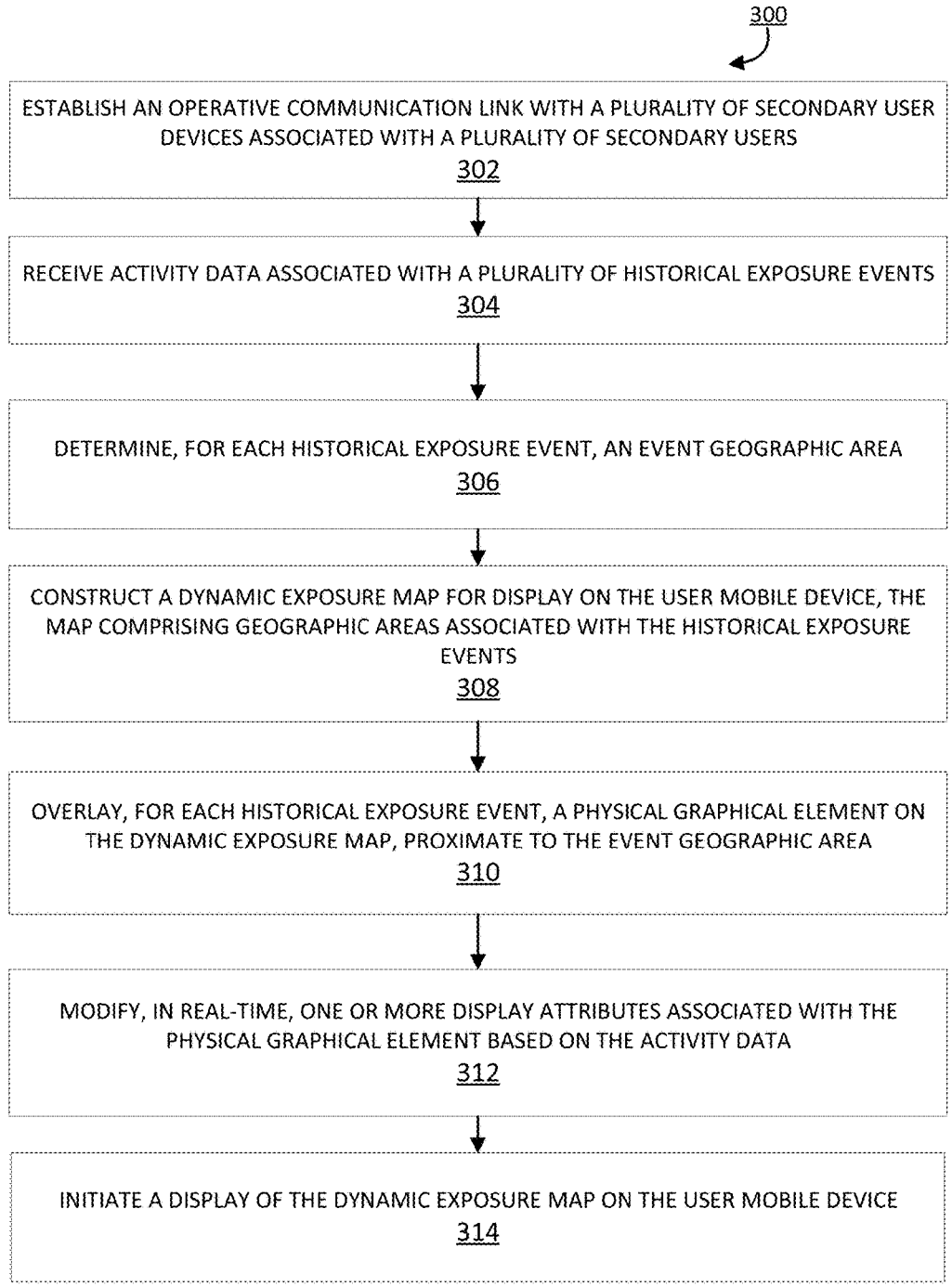
Figure 4:
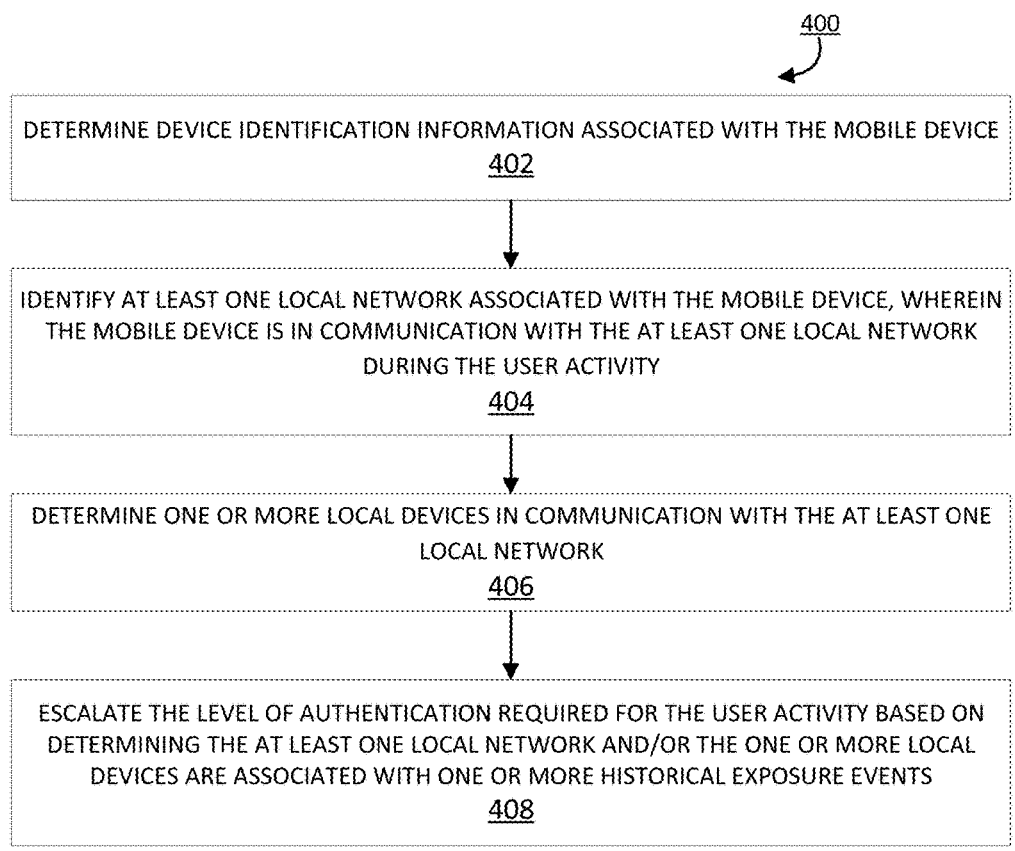
Figure 5:
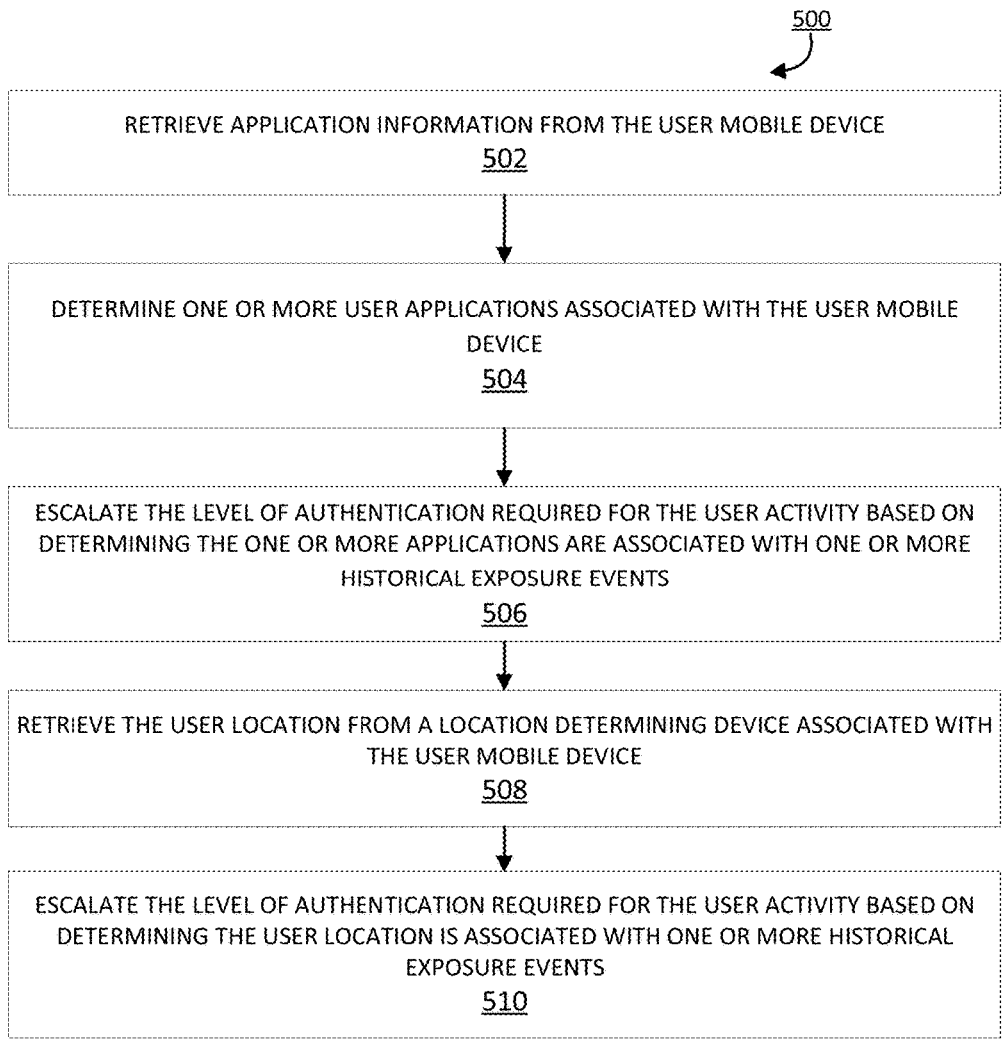
Figure 6:
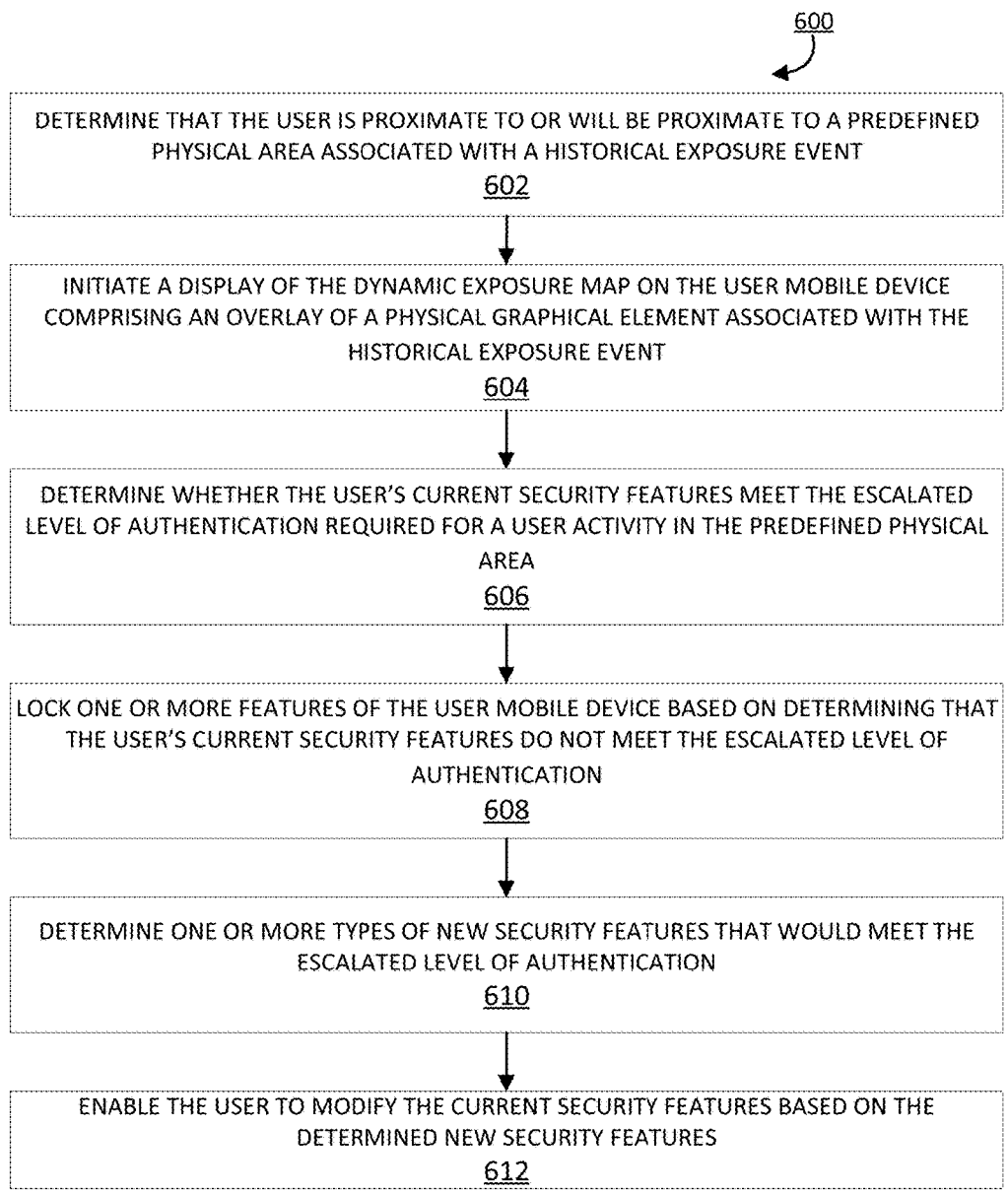

FIG. 3 schematically depicts a high level process flow for constructing a dynamic exposure map with overlaid activity areas in accordance with an aspect of the invention;

FIG. 4 schematically depicts a high level process flow for escalating authentication requirements based on historical exposure events associated with network connections in accordance with an aspect of the invention;

FIG. 5 depicts a high level process flow for escalating authentication requirements based on historical exposure events associated with user applications and locations in accordance with an aspect of the invention;

FIG. 6 depicts a high level process flow for strengthening security features based on situational instance in accordance with an aspect of the invention.

Figure 7A:
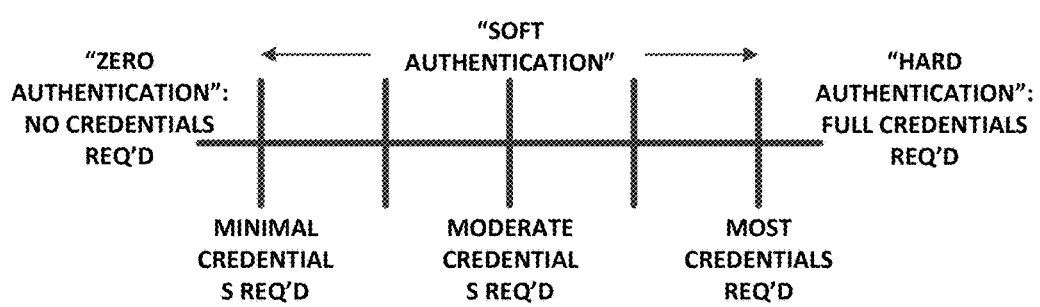
Figure 7B:
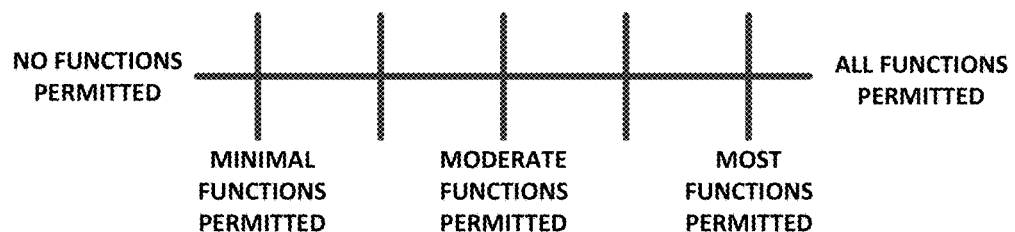
Figure 7C:
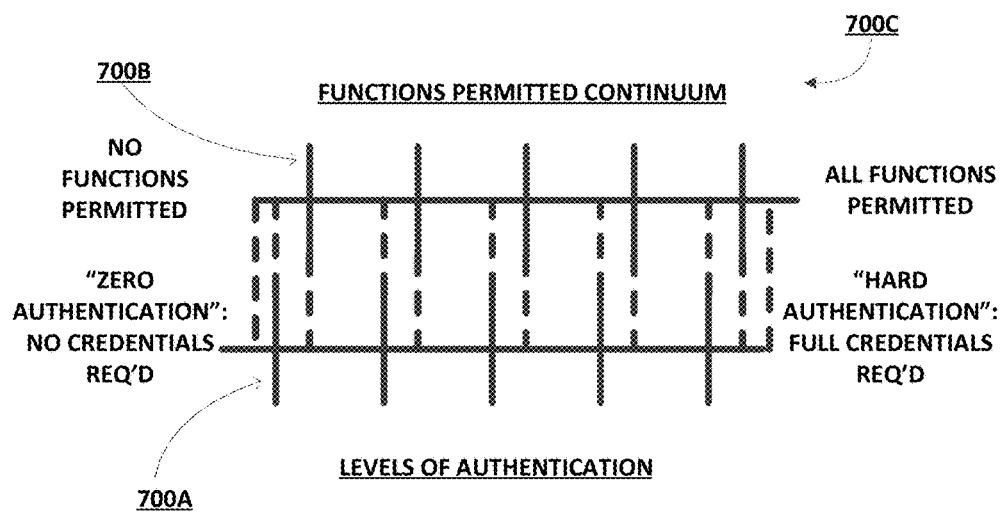
Figure 7D:
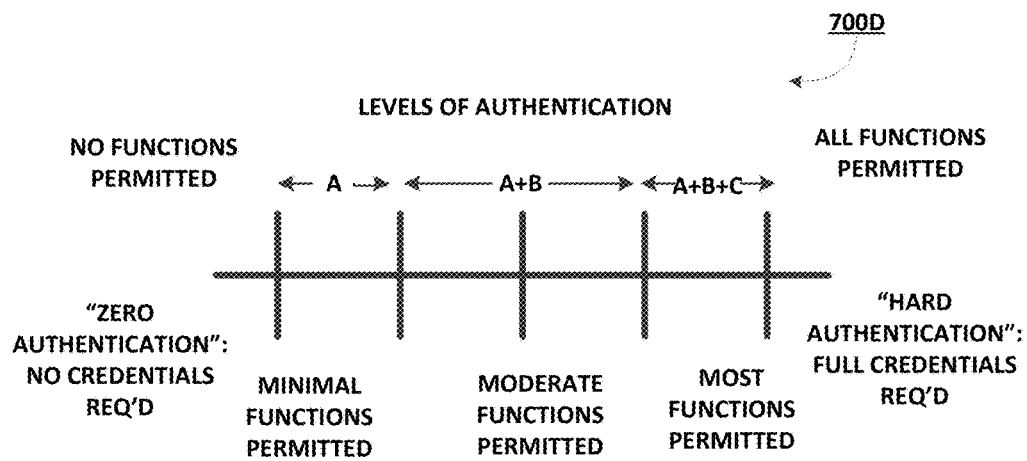

FIG. 7A presents an illustration of the authentication continuum in accordance to one embodiment of the invention;

FIG. 7B presents an illustration of the functions permitted continuum in accordance to one embodiment of the invention;

FIG. 7C presents an illustration of the coupling of the functions permitted continuum and the levels of authentication continuum in accordance to one embodiment of the invention; and FIG. 7D presents an illustration of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, portable multi-function devices, such as laptop computers, tablet computers, mobile phones, smart phones, wearable devices and the like are common. Typically, individuals may have a user device with them when in public. These user devices have the capability to hold large amounts of information, including personal information, resource data (information associated with user resources like banking accounts, payment instruments like credit cards and the like). In other aspects the user devices may enable access to resource data stored at other sources and databases based on requisite authorization. These devices may also be configured to enable the user to perform one or more activities, transactions or resource transfers through an application via online banking, mobile banking, mobile wallets and the like. As such, advancements in technology have facilitated numerous new methods for resource transfer and utilization with user devices. A need exists for authentication systems that provide dynamic authentication features as the situational instance of the user devices vary, to ensure safety and security of user information.

Embodiments of the present invention address the above needs and/or achieve other advantages by providing apparatuses (e.g., a system, computer program product and/or other devices) and methods for providing an authentication system for assessing network authentication requirements based on situational instance, as will be described in detail elsewhere in the specification. FIG. 1 illustrates a system environment 100 for assessing network authentication requirements based on situational instance, in accordance with one embodiment of the present invention. FIG. 1 provides a unique system that includes specialized servers and systems, communicably linked across a distributive network of nodes required to perform the functions of providing dynamic authentication paradigms. The authentication system provides a dynamic platform for determining authentication requirements in real-time As illustrated in FIG. 1, the authentication system 108 or application server is operatively coupled, via a network 101 to the user system 104, to the financial institution system 106 and to one or more secondary user systems 110. In this way, the authentication system 108 can send information to and receive information from the user device 104, the financial institution system 106 or financial institution server and a plurality of secondary users via the secondary user systems 110. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the user 102 is an individual that has a user device, such as a mobile phone, tablet, or the like. FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 may comprise other devices that are not illustrated, configured for location determination/navigation (GPS devices, accelerometers and the like), for authentication (fingerprint scanners, microphones, iris scanners and the like), for image capture (cameras, AR devices and the like), for display (screens, hologram projectors and the like), and other purposes. The user device 104 is a computing system that enables the user to perform one or more user activities. The processing device 114 is operatively coupled to the communication device 112 and the memory device 116. The processing device 114 uses the communication device 112 to communicate with the network 101 and other devices on the network 101, such as, but not limited to the financial institution system 106 and the authentication system 108. As such, the communication device 112 generally comprises a modem, server, or other device for communicating with other devices on the network 101.

The user device 104 comprises computer-readable instructions 120 and data storage 118 stored in the memory device 116, which in one embodiment includes the computer-readable instructions 120 of a user application 122. In some embodiments user device 104 may refer to multiple user devices that may be configured to communicate with the authentication system and/or the financial institution system via the network 101. The user application 122 may be a standalone application configured for dynamic authentication assessment or the user application 122 may refer to one or more existing applications on the user device. In some embodiments the authentication system 108 and/or the financial institution system may transmit control signals to the user device, configured to cause the user application 122 to perform one or more functions or steps associated with assessing authentication requirements based on situational instance.

As further illustrated in FIG. 1, the authentication system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the financial institution system 106, the user system 104 and the secondary user systems 110. As such, the communication device 146 generally comprises a modem, server, or other device for communicating with other devices on the network 101.

As further illustrated in FIG. 1, the authentication system 108 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of network authentication requirements based on situational instance.

In the embodiment illustrated in FIG. 1 and described throughout much of this specification, the authentication application 158 may monitor the user network connections, user location and user applications associated with a user device. In some embodiments, the authentication system 108 may retrieve user authentication information, financial information and the like from the financial institution system 106. In some embodiments, the authentication application 158 may receive activity data associated with a plurality of historical exposure events from the secondary user system 110 and/or the financial institution system 106. In this way, the authentication application 158 may communicate with the financial institution system 106, the user device 104, secondary user system 110, merchant systems and other third party systems to determine authentication requirements for a particular activity based on situational instance.

In some embodiments, the authentication application 158 may control the functioning of the user device 104. In some embodiments, the authentication application 158 computer readable instructions 154 or computer-readable program code, the when executed by the processing device 148, causes the processing device to perform one or more steps involved in assessing authentication requirements and/or transmit control instructions to other systems and devices to cause the systems and devices to perform specific tasks.

As illustrated in FIG. 1, the financial institution system 106 is connected to the authentication system 108 and is associated with a financial institution network. In this way, while only one financial institution system 106 is illustrated in FIG. 1, it is understood that multiple network systems may make up the system environment 100. The financial institution system 106 generally comprises a communication device 136, a processing device 138, and a memory device 140. The financial institution system 106 comprises computer-readable instructions 142 stored in the memory device 140, which in one embodiment includes the computer-readable instructions 142 of an institution application 144. The financial institution system 106 may communicate with the authentication system 108 to provide authentication credentials for user activities. The authentication system 108 may communicate with the financial institution system 106 via a secure connection 160 generated for secure encrypted communications between the two systems for ascertaining authentication requirements. In some embodiments, the secure connection 160 may be an operative communication link/channel established via the network 101.

The secondary user system 110 may be similar to the user device 104 and/or the financial institution system 106. The secondary user system 110 may comprise a communication device 166, a processing device 168, and a memory device 170. The memory device 170 may further comprise computer readable instructions 172, that when executed by the processing device 168, cause the historical activity data application 174 to transmit activity data concerning historical exposure events to the authentication system 108.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 2, a general process flow 200 is provided for assessing network authentication requirements based on situational instance. The process flow 200 is directed to, in general, dynamic determination of authentication requirements for a certain user activity, based on determining congruence of aspects of the user activity with historical exposure events. In this regard, the system may receive a request from a user seeking to execute a user activity, as illustrated by block 202. The user activity may comprise one or more activities associated with an entity or a financial institution described previously. In this regard, the user may employ a user device 104, (e.g., a mobile device or another computing device) to perform an electronic activity (e.g., in which the user interacts with the financial institution system 106, or another entity/merchant system). For example, the user may access and/or perform another activity (e.g., transfer funds or pay bills) using an online banking account at a financial institution. By way of further example, the user may perform a mobile wallet transaction. As another example, the user may purchase goods or services using a bank account at a financial institution.

Typically, execution of the user activity requires validation of one or more authentication credentials, based on the type of activity. In this regard, the user activity may be associated one or more authentication credentials related to an existing level of authentication. For example, a user activity comprising accessing a mobile device application may be require authentication using a username and password. The credentials of username and password may be associated with a first level of authentication. As another example, another user activity comprising initiating a purchase using a user application may require credentials with a second, higher level of authentication, for example payment instrument identifiers and their associated personal identification numbers (PIN).

However, the existing level or authentication or default authentication, associated with the activity itself, may not be satisfactory in instances where the user may be potentially exposed to misappropriation or in instances where chances of unauthorized access to the user's personal and financial information is heightened. With electronic activities becoming ubiquitous, the technological parameters associated with the user activity or the situational instance of the user activity, like the method of conducting the activity (online, mobile, purchase transactions using tokens, card present transaction, and the like), the technical aspects of the device used to conduct the activity (network connections, stored applications, authentication features), physical location of the user activity, merchants and other entities that gain access to user's financial/personal information (in both electronic and physical forms) in the course of the activity, influence the security and confidence in the user activity. Since the methods and modes of intercepting personal information and exposure in electronic activities are greater in number and technically varied, in comparison with non-electronic transactions like payment with cash/currency, there is a need for effective systems to safeguard personal and financial information and to mitigate exposure of electronic activities. The present invention provides a novel solution configured to dynamically assess the authentication requirements, based on the both the type of the user activity and the technological parameters/situational instance of the user activity, in real-time, to ensure security and safety of the user's financial and personal information. For example, the system may determine that conducting a first user activity in an unsecured/unknown wireless communication area may potentially effect the security of the user's personal information. In such instances, the system may escalate, in real-time, the required level of authentication from the existing level (for example, a passcode) to a higher level (for example, a fingerprint scan) for executing the user activity as long as the parameters associated with the activity deem to require such. Continuing with the example, for the first user activity, the system may escalate the authentication level from a first level to a higher second level as long as the user is in the vicinity of the unsecure wireless communication area and then reduce the authentication level back to the first level when the user is in secure/known wireless communication area like the user's home or within the premises of a financial institution, to expedite the process. In some embodiments, the system may determine that escalation of the level of authentication for a certain user activity is required based on historical exposure events as described in detail below. In some embodiments, the system may deny/decline the request to execute a user activity based on the congruence of the technological parameters/situational instance of the user activity and certain historical exposure events, to safeguard personal information.

At block 210, as alluded to previously, the system receives a request to execute a user activity. Typically, the system establishes an operative communication link with the mobile device of the user, and the request is received via this communication link. In some embodiments, the request comprises the user accessing or opening an application associated with the activity, via the user mobile device. For example, the user opening a mobile banking application to view account balances or opening a page within the application to modify account preferences. In some embodiments, the request comprises receiving the existing/default authentication credentials from the user. In some embodiments, the system constantly monitors the user's devices and activities based on requisite permissions from the user, and the subsequent steps are triggered, automatically, in response to the system identifying that the user seeks to execute the user activity. For example, the system may identify that the user seeks to initiate a purchase (user activity) based on determining that the user has initiated a check-out step for purchasing one or more products using a merchant application. The system may then, automatically, initiate assessment of the user's situational instance and authentication requirements before allowing the user to provide personal/financial information (address, contact information, payment information) and/or before allowing the merchant application/browser application to auto-fill the personal information based on stored data. Here, the system may prevent check-out, dissuade input of personal information, lock the display screen of the device or otherwise suspend certain functionality associated with the merchant application and/or the mobile device, until the requirement of escalated authentication based on situational instance is ascertained and/or authentication credentials associated with escalated levels of authentication are validated. In this regard, the system may be overarching and may be configured to control one or more applications, operating system, user interface and other functionality associated with the user mobile device, based on receiving prior authorization from the user.

In some embodiments, establishing an operative communication link with the mobile device comprises identifying the mobile device and/or the user associated with the mobile device. The mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored, associated with the user profile (user profile comprising user authentication information, user authorization, user preferences and the like) and subsequently used to identify the user of the mobile device, when requests to execute user activities are received. In other embodiments, the user associated with the user activity may be identified based on default authentication credentials, user application information and the like and then correlated with one or more accounts associated with the user.

Based on receiving the request to execute the user activity, the method includes monitoring, in real-time, the situational instance associated with the user activity, as illustrated by block 204. In some embodiments, the system may continuously monitor the situational instance associated with the user activity, to provide dynamic assessment of authentication requirements. Monitoring the situational instance may comprise ascertaining the technological security parameters associated with the user activity, comprising at least user network connections, user location and user applications. Monitoring the user network connections, typically comprises identifying at least one local network that the mobile device is currently connected to and determining one or more local devices in communication with the local network. Monitoring the user applications comprises determining one or more applications stored on the mobile device and determining activities of the one or more applications. Monitoring the user location may comprise determining the current physical location of the user mobile device. These steps will be described in detail with respect to FIGS. 4 and 5, elsewhere in this disclosure.

As discussed previously, with the advent of the internet there has been an increase in electronic activities, online and mobile transactions, and widespread use of smartphones, tablets, laptops and other computing devices in general. However, widespread use of technology has resulted in a large number of exposure events, where users' personal and financial information has been compromised or misappropriated. Typically, exposure events may comprise transactions or activities that involve compromise or misappropriation of personal/financial information, unauthorized transfer of funds, repeat billing for purchase transactions and the like. The users associated with these exposure events, hereinafter referred to as "secondary users," may report these exposure events to financial institutions, merchants and other entities by flagging unauthorized transactions or purchases, or the financial institutions or entities may identify the exposure events and in turn, notify the user.

Exposure events comprise interception of data at a first instance of time, particularly data that is routinely and necessarily available to an entity during a user activity (for example, a merchant requires payment credential information to process a purchase transaction). However, the associated user or entity may not be able to identify/discover the exposure until the intercepted data is used to perform at least one unauthorized activity/transaction at a later time, while the user's information continues to be at risk. In such instances, identifying the mode of the exposure and the specific technological parameter that needs to be addressed may be possible, if at all, after a significant time lapse succeeding the unauthorized activity. The advantages provided by the present invention in this regard are twofold. Firstly, the system provides proactive and preventative security measures that assess and augment the security of technological parameters/situational instance for an activity in real-time, before the occurrence of an unauthorized transaction. Secondly, the monitoring of the situational instance/technological parameters ensures that even if a future exposure event occurs, the required situational data is available to identify causes and parameters that need to be reinforced.

The present invention provides a novel method of safeguarding the user's financial and personal information, in light of the historical exposure event data received from a plurality of secondary users, as indicated by block 206. In this regard, the system may establish operative communication links with secondary user systems associated with the plurality of secondary users. In some embodiments, a secondary user may be the user/customer associated with the exposure event, for example the account holder, while in other embodiments, the secondary user may be an entity, for example a financial institution associated with the account, or the entity identifying the exposure event.

The system receives activity data regarding historical exposure events from a plurality of secondary users. The activity data may comprise information regarding the situational attributes associated with the historical exposure events. In some embodiments, the historical exposure events may be similar to the user activities described previously that have been identified to be associated with exposure or misappropriation. In some embodiments, a secondary user may provide information regarding the network connections, locations, applications and/or merchants associated with an exposure event related to a secondary user account. For example, the secondary user may provide information associated with an exposure event comprising a repeat billing for a purchase made through a first application stored on the secondary user device, which was not resolved by the associated merchant. In this regard, the system may flag the merchant and/or the first application as having higher exposure. In some embodiments, the system may identify the situational instance of an exposure event indicated by a user. As another example, another secondary user may indicate exposure event comprising interception of the user's personal information resulting in unauthorized access to a social media account of the user. The system may then retrieve network connection history and activity history of one or more secondary user devices, based on receiving the appropriate credentials from the user, and then identify that the user initiated a social media session by providing login credentials using an unsecure/unknown wireless network as a certain time, that is different from the user's known/trusted networks. The system may then determine a situational attribute for the exposure event comprising a network identifier associated with the unsecure network.

In some embodiments, the secondary user may be affiliated with the system and/or a financial institution system or an entity system that monitors the situational attributes of user activities. In this instance, the secondary user may merely flag a particular user activity conducted at a historical time or location as unauthorized, or a financial institution may identify a particular transaction as being associated with an exposure event. The system may then automatically retrieve the situational instance associated with the historical exposure event and identify the appropriate technological parameters that contributed to the event. For example, the system/financial institution system may detect an exposure event directed to unauthorized access via a mobile banking application of a secondary user. The system may analyze application information associated with one or more applications/widgets stored on the user mobile device and identify that a certain second application is tracking the user's keyboard/touch gestures and thereby gathering login information. The system may then flag the second application as the situational instance associated with the exposure event. As another example, the system may detect, in real-time, unauthorized retrieval of data from a mobile device associated with a secondary user. The system may then access the mobile device and determine the current network connections. In conjunction with one or more external systems, the system may identify one or more network devices also currently connected to the network, and flag them as potentially contributing to the exposure event with a first degree of probability. Repeated flags for a particular network device at varying circumstances, may cause the system to identify the particular device as being the cause of the exposure event with a higher second degree of probability.

The system may then store the received activity data in a structured secured database. In this regard, the system may transform the data may transform the activity data into a suitable file format, encode/encrypt the data/files in such a way that the plaintext is available only to the authorized system with a specific decryption key. In some embodiments, the system establishes a federated network of one or more financial institutions and other entities and creates a centralized repository of activity data regarding exposure events concerning all of the entities to identify potential threats. This centralized repository may be updated, continuously and in real-time, as activity data regarding historical exposure events is received, to ensure that the information is current. Although termed as historical, the exposure events may be associated with current exposure events identified in real-time or near real-time, recent exposure events conducted/identified hours or days prior to the current time, or older exposure events conducted/identified weeks, months or years prior to the current time.

Based on monitoring the user network connections, user location and user applications associated with the sure activity, the system may extract or retrieve activity data regarding historical exposure events, at block 206. In some embodiments, the system may extract only the activity data pertaining to those historical events that are identical/similar to the user initiated activity, to improve processing speed, reduce temporary/cache storage requirements and for quicker perusal. For example, historical events in the same state or city of the user, historical events associated a mobile device type (for example, based on the model or the operating system of the device), historical events within a predetermined time period, historical events with a similar type of user activity (for example, online transactions, or transactions using a specific mobile application, transactions associated with an entity), and the like. However, in other embodiments, the system may retrieve and/or parse activity data concerning all known exposure events.

Next, at block 208, the system may compare the user network connections, user location and/or user activity data determined at block 204, with the activity data associated with historical exposure events. In this regard, the system may compare and correlate the determined situational instance of the user activity with the situational instances of historical exposure events. The system may compare the determined network connections of the user with the network connection information of the retrieved activity data, compare the user location with the locations of the exposure events and/or compare the user application data with the application data associated with the exposure events.

The system may then escalate the level of authentication required for the user to execute the user activity based on determining that at least one of the (i) user network connections, (ii) user location and/or (iii) user applications are associated with at least one historical exposure event, at block 210. In this regard, the system may identify the default or current authentication requirements or authentication level required, for the user to execute the activity. The system may ascertain the escalated higher authentication level required based on the identified at least one historical exposure event that has similar situational instance as the user activity. Alternately, in some embodiments, the system may limit the permissible functions for the given default level of authentication based on determining that the situational attributes are associated with historical exposure events. For example, the system may only allow the user to view account balances, but may block payments/transactions based on determining that the user location is associated with a location with known incidents of exposure, for as long as the user is at that location.

Typically, the user authentication is associated with multiple, predetermined levels of authentication, based on the functions that are permitted for the given authentication level. For example, a lowest level of authentication may be sufficient to execute certain functions/activities like opening an application, viewing predetermined content and the like. A higher level of authentication may be required for other functions like modifying content, performing purchases. Typically, the level of authentication may be associated with one or more types of authentication credentials. For example, a low level of authentication may be associated with authentication credential types like a passcode, a swipe gesture, or no requirement for credentials at all. A moderate level of authentication may be associated with authentication credentials types like a username accompanied by an alphanumeric password, an account identifier along with an expiration date and the like. A high level of authentication may be associated with authentication credential types like biometric information (fingerprint scans, iris scans/facial recognition, voice recognition and the like), username accompanied by a one-time passcode generated/provided on another linked user device and the like. In some embodiments, the authentication level may be escalated using a combination of the authentication credential types. For example, the authentication level of a username-passcode authentication may be increased to a higher level with the user providing additional out of wallet credentials like predefined security questions, user contact information, identification information and the like. There may be multiple levels of authentication (3, 10, 15, or the like), with each level being associated with a numeric, alphabetic, visual or another suitable identifier.

The system ascertains the escalated authentication level based on at least the attributes associated with the historical exposure events determined to have similar situational instances as the user activity. The attributes of the exposure events determined to have similar situational attributes may comprise the number events, frequency of occurrence of events, significance of the event (type of exposure, type of data involved, amount of funds involved and the like), times of occurrence and other similar attributes. For example, a user activity may be associated with a default authentication level A. Based on determining that the user activity is associated with a network determined to have a predetermined large number exposure events frequently, the system may escalate the required authentication to a higher level C. Alternately, based on determining that the user activity is associated with a network determined to have only one such exposure event and determined to have occurred before a predetermined time period (for example, a year), the system may escalate the required authentication to a higher level B. In this regard, the authentication level C may be higher than the authentication level B. In some embodiments, the system may require the escalated level of authentication only as long as the user activity is associated with the situational instance determined to be similar to historical exposure events, so that the user is not subjected to undue delays or inconvenience when not deemed necessary. Therefore, the system may de-escalate/reduce the level of authentication based on determining that the situational instance is no longer associated with historical exposure events. For example, based on determining that an application stored on the user mobile device is associated with at least one historical event, the system may implement the escalated authentication requirements until the application is closed or is uninstalled. As another example of the dynamic assessment of authentication, the system may vary the authentication requirements, automatically, based on the user location, as the user moves through physical areas, each area being associated with a certain level of required authentication based on exposure events in that area. In other embodiments, the system may maintain escalated level of authentication on a more permanent basis, to ensure increased safety and security of user activities.

Based on determining the escalated authentication requirement, the system may present the escalated authentication requirement to the user, via the user mobile device, at block 212. In this regard, the system may also request one or more credentials determined to be associated with the escalated authentication level. As described previously, the system may block functionality associated with the mobile phone, until (i) successful validation of escalated authentication credentials received from the user and/or (ii) the situational instance of the user activity is no longer associated with historical exposure events. The system may enable the user to execute the user activity based on receiving a positive authentication response, at block 214.

FIG. 3 illustrates a high level process flow 300 for assessing authentication requirements and constructing visual representations of activity data associated with historical exposure events. As illustrated by block 302, the system may establish an operative communication link with a plurality of secondary user devices associated with a plurality of secondary users. The system may then receive, via the established links, activity data associated with a plurality of historical exposure events at block 304. These steps may be similar to those described with respect to block 206 of process flow 200.

The system may then determine, for each historical exposure event, an event geographic area, as indicated by block 306. In this regard, the event geographic area may comprise geographic coordinates, zip codes, street addresses and the like. In some embodiments, the system may receive the location information along with the activity data associated with the plurality of historical exposure events. In other embodiments, the system may determine the location of the historical exposure event based on retrieving transaction/activity information associated with the exposure event from a financial institution database or an entity database. In some embodiments, the geographic area may comprise an area related to the location of the merchant, user and/or entity at the time of the historical exposure activity, for example, a store, an establishment and the like. In some embodiments, the geographic area may also comprise an area proximate to the area of the exposure event in addition to the location of the event. The proximate area may comprise a predetermined radius around the area of the exposure event, the margin of error of the location determining device of the mobile device, the wireless communication area associated with the exposure event and the like. In some embodiments, the event geographic area comprises a geo-fence or a virtual perimeter enclosing the area of the merchant/user establishment/building and/or the area proximate to the establishment/building.

The system may then construct a dynamic exposure map for display on the user mobile device, the map comprising geographic areas associated with the historical exposure events, as illustrated by block 308. In some embodiments, the dynamic exposure map comprises a primary map. In this regard, the system may retrieve a suitable primary map. Typically, the primary map comprises a two dimensional/three dimensional representation of a real-world geographic area in a suitable scale, depicting the topography, relief, routes/roads, administrative boundaries, entities/establishments, associated information and the like. The primary map may comprise the geographic areas included in a predetermined distance/radius from a user location, areas associated with suitable zip codes, one or more cities/states/countries and the like. In some embodiments, the primary map may be dynamic and may vary in response to user input or may vary automatically in response to changes in the user location, orientation of the user mobile device and the like. In some embodiments, the primary map comprises a video stream of an image capture device of the mobile device, real-time audio visual information about the user's environment from an augmented reality (AR) application on the mobile device and the like. The system may retrieve suitable primary maps for display on the mobile device, from suitable databases and/or applications stored on the user mobile device. In some embodiments, the system may transmit control instructions to one or more web mapping, mobile mapping, navigation, AR and other applications stored on the mobile device, causing the application to present a display of the primary map on the mobile device.

Next, the system may overlay, for each historical exposure event, a physical graphical element on the dynamic exposure map, proximate to the event geographic area, at block 310. Typically, the physical graphical element is a visual representation of the event geographic area. In this regard, the system may overlay the physical graphical element on the primary maps described above.

In some embodiments, overlaying may comprise superimposing the physical graphical element on a dynamic display of the primary map that varies in real time based on the user's location/device orientation or superimposing the physical graphical element, as illustrated by the following example. The user may be travelling either by walking, driving or the like. In this regard, the user may utilize a mobile navigation that presents the dynamic exposure/primary map, mapping or AR application, the system may automatically transmit control instructions that cause the application to present the respective dynamic exposure/primary map on the display of the mobile device or the system may construct and display the dynamic exposure map in conjunction with the location determining device and/or image capture device of the mobile device. The system may overlay, in real-time, one or more physical graphical elements on the dynamic exposure map at a suitable location with respect to the map while the pap is being displayed, without altering the structure/content of the map. For example, the system may overlay the physical graphical element at the approximate coordinates/street addresses of the historical exposure event depicted/included in the current view of the dynamic exposure map. The system may automatically vary the location of the superimposed physical graphical element within the display, in response to variation in the view of the dynamic exposure map due to changes in the user's location. As another example, in the instances where the user device is associated with an AR application or currently capturing video streams of the user's surroundings, the system may analyze the captured video and identify entities/merchants, buildings/establishments, and the like in the current video stream. The systems may then overlay, superimpose or otherwise position the physical graphical element based on determining that the identified entity/merchant/location is associated with a historical exposure event.

In some embodiments, overlaying the physical graphical element may comprise modifying the primary map to include the physical graphical element. For example, the system may move, change or remove existing visual representations in the primary map to insert the physical graphical element. For example, the system may change the brightness or color of a building/area in the display that is associated with a historical exposure event. In some embodiments, the system may create a new composite/integrated dynamic exposure map with the primary map augmented with the physical graphical elements.

The physical graphical element is generally a graphical representation that highlights, outlines, identifies or otherwise indicates the event geographic area. The graphical representation may include, for example, all types of media, such as text, images, clipart, video clips, movies, or any other type of physical graphical element. In some embodiments, the physical graphical element may be activatable (i.e., include an embedded link), such that the user may "select" the physical graphical element and retrieve information related to the associated at least one historical exposure event (date, type of event and the like). In this regard, the user may "select" the physical graphical element by any conventional means, e.g., keystroke, touch, voice command or the like, for interaction with the mobile device. The information may include any desired information associated with the historical exposure event and may range from basic information to greatly detailed information. In yet other embodiments, the physical graphical element information related to the historical exposure event may be visualized by the user without "selecting" the physical graphical element.

Furthermore, the physical graphical element may be displayed at any size on the mobile device display. The physical graphical element may be small enough that it is positioned on or next to the event geographic area being identified such that the event geographic area remains discernable behind the physical graphical element. Additionally, the physical graphical element may be semi-transparent or an outline of the event geographic area, such that the event geographic area remains discernable behind or enclosed by the physical graphical element. In other embodiments, the physical graphical element may be large enough to completely cover the event geographic area portrayed on the current view of the display. Indeed, in some embodiments, the physical graphical element may cover a majority or the entirety of the mobile device display.

Next at block 312, the system may modify, in real-time, one or more display attributes associated with the physical graphical element based on the activity data. The display attributes may comprise color, shape, size, orientation, brightness, type of media and the like associated with the physical graphical element. In some embodiments, the system may enable the user to associate each type of situational attribute with one or more display attributes. For instance, the system may initially overlay a physical graphical element of color 1 for a historical exposure event associated with a particular merchant at the location. The system may modify the color of the overlaid element to a color 2, in real-time, based on determining another exposure event at the same location associated with an unsecure wireless communication or to a color 3 based on determining another exposure event at the same location associated with the said merchant. Therefore, the system may modify the display attributes based on the frequency of occurrence of exposure events at a particular location, based on type of exposure events at the location, based on the number of exposure events in a predetermined period of time preceding the current time, an exposure rating (provided by secondary users or other relevant entities) associated with the location and other factors associated with the activity data.

In some embodiments, the system may highlight safe zones for user activities on the dynamic exposure map, indicating areas without exposure events in a predetermined amount of time, areas with safe/known wireless communication, areas with trusted merchants and the like. In this regard, the system may indicate safe zones with methods similar to those described with respect to blocks 306-312.

The system may initiate a display of the dynamic exposure map with overlaid activity areas on the user mobile device at block 314. In some embodiments, the system may trigger audible, visual and/or vibratory alerts in response to determining that the user's current location is within or within a proximate distance to at least one event geographic area identified at block 306, based on analyzing the user's current location retrieved from a GPS device of the mobile device, the user's social media updates, recognizing objects from an AR video stream and the like. In some embodiments, the system may initiate a presentation of the dynamic exposure map along with the aforementioned alerts. In some embodiments, the system may further modify the display attributes of the at least one event geographic area that the user is currently in or is proximate to. For example, the system may associated each authentication level with a color and indicate the color of the activity area based on the determined authentication level required for that area. For example, the system may cause a flashing display of the graphical element associated with said at least one geographic area to attract the user's attention. In this regard, the system may lock the display screen of the mobile device with the presentation of the dynamic exposure map, disable certain functionality and applications or otherwise restrict the functionality/use of the mobile device until the user is not proximate/within the event geographic area, and/or for a predetermined period of time, and/or until the user provides escalated authentication credentials.

In this regard, the system includes an "always on" feature in which the system causes the mobile device to continuously determine the user location using a location determining device (GPS device and the like) and/or capture video, and analyze user's location in conjunction with the activity data. The user may set any number of user preferences to tailor the alerts to their needs. For instance, the user may opt to only be alerted if a certain type of historical exposure event is identified at the user's current or nearby locations. Additionally, it will be appreciated that the "always on" feature in which the user's location is continuously captured may consume the mobile device power source more quickly. Thus, in some embodiments, the "always on" feature may disengage if a determined event occurs such as low power source, if the mobile device remains for an extended period of time, the user sets a certain time of day to disengage, etc. Conversely, if the "always on" feature is disengaged due to the occurrence of such an event, the system may cause the "always on" feature to re-engage after the duration of the disengaging event (e.g., power source is re-charged, the user has moved, etc.).

FIG. 4 illustrates a high level process flow 400 for escalating the required level of authentication for a user activity based on at least the user network connections. In this regard, the system may monitor the user network connections, typically comprising identifying at least one local network that the mobile device is currently connected to and determining one or more local devices in communication with the local network. In some embodiments, the user/the user mobile device may communicate with the system via the at least one local network, while in other embodiments the at least one local network may be another network that the mobile device is connected to, in addition with a primary network used to communicate with the system or the primary network used to establish the operative communication link. Initially, the system may seek to determine device identification information associated with the mobile device at block 402. The system may identify the mobile device and the user and correlate the user activity with one or more accounts of the user, in a manner similar to the steps described with respect to block 202.

Monitoring an electronic activity associated with the user typically includes identifying at least one local network to which the user mobile device performing a particular user activity is connected, based on receiving requisite permissions from the user. As illustrated by block 404, the system determines at least one local network associated with the mobile device, wherein the mobile device is in communication with the at least one local network during the user activity. In some embodiments, the local network is the local area network (LAN) to which the computing device of the user is connected. Although termed as a local network, it is contemplated that, in some embodiments, the local network may refer to computer networks, virtual private networks, campus area networks, storage area networks and other telecommunications networks associated with the mobile device. In some embodiments, the local network refers to a personal area network utilizing near field communication, Bluetooth®, body area networks and accompanying wearable devices of the user, wireless USB, and the like. The system may collect network information from the mobile device that may be used to identify such local network, such as the service set identifier (SSID) of a wireless local area network (WLAN). In some embodiments, the system may prompt the user mobile device being used by the user to provide information that can be used to identify such local network.

Next, the system may determine one or more local devices in communication with the at least one local network, as depicted by block 406. In this regard, the system may collect device identification information for local network devices connected to the at least one local network during the user activity. As used herein, a "local network device" or a local device is any computing device (e.g., a personal computer, laptop, tablet computer, mobile phone, or the like) that is connected to the same local network as the computing device being employed by the user to perform an electronic activity. For example, if the user's mobile device is connected to a wireless local area network, the local network devices would be the other computing devices connected to such wireless local area network. Typically, identifying information for the local network and local network devices is collected for each user activity performed by the user, requiring authentication. In some embodiments, this collected identifying information is stored temporarily by the system, until the authentication requirements are ascertained, while in other embodiments this information may be stored in a suitable secure location (for example, in data storage 152).

At block 408, based on determining that (i) the at least one local network is associated with one or more historical events, and/or (ii) the device identification information associated with the local network devices in communication with the at least one local network is similar to that of devices associated with origination of previous incidents malfeasance/exposure, (a) the subsequent user activity may be denied (e.g., the system may not allow the subsequent user activity to be completed), (b) the level of authentication required to complete the subsequent user activity may be escalated, or (c) the level of authentication required to complete the subsequent user activity may be decreased.

FIG. 5 illustrates a high level process flow 500 for escalating the required level of authentication for a user activity based on at least the user application and/or the user location. At block 502, the system may retrieve user application information from the mobile device of the user, as described previously with respect to process flow 200. The system may then determine one or more applications associated with the user mobile device at block 504. The system may then compare the user application information with the activity data to determine if one or more applications stored on the user's mobile device are associated with historical exposure events. In this regard the system may consider all applications stored on the user mobile device, applications currently running or active, and/or applications running in the background. For example, the system may determine that the user device is associated with application 1 stored on the device. The system may further determine that the application 1 was previously identified to be associated with fraud or data retrieval and transmission, unbeknownst to users. In response the system may escalate the level of authentication required for the user activity based on determining that the at least one of the one or more applications are associated with one or more historical exposure events, at block 506. Continuing with the previous example, the system may escalate the authentication required to access the user's information, such that the application 1 is not able to access the user's information. In some embodiments, the system may disable the active application 1 for the period of the user activity and/or uninstall the application 1 based on receiving authorization from the user.

At block 508, the system may retrieve the user location from a location determining device associated with the user mobile device. The location determining device may be a GPS device, an accelerometer, or any other location detecting devices/methods known in the art. In some embodiments, the system may determine the user's location based on the interaction between the mobile device and other external devices like multilateration of radio signals between radio towers of the network and the mobile device, triangulation of the device location based on the device's communication with a cellular network, interaction of the mobile device with beacon devices/transmitters via near field communication or electromagnetic waves/sound waves and the like. Although termed as the location determining device, in some embodiments, the system may determine user location based on analyzing user information, user social media information, location input provided by the user, analyzing current AR feeds or camera images and the like. The system may escalate the level of authentication required for the user activity based on determining that the user location is associated with one or more historical exposure events at block 510, similar to the steps described in process flows 200 and 300.

FIG. 6, illustrates a high level process flow 600 for strengthening security features based on the user's situational instance. The system may determine that the user is proximate to or will be proximate to a predefined physical area associated with a historical exposure event, at block 602. The predefined physical area may be the event geographic area associated with the historical exposure event, described previously. In some embodiments, the system may determine that the user is currently within or proximate to the predefined physical area. In this regard, the system may determine the user's current location using any of the methods disclosed herein or any other methods known in the art. In some embodiments, the system may determine that the user will be proximate to a predefined physical area associated with a historical exposure event at a certain future time or during a future time period. In this regard, the system may analyze user's upcoming appointments, calendars, social media information, travel patterns, routes on navigation applications, search history and purchase transactions to determine future locations of the user. After determining the user's current and/or potential future locations, the system may compare these locations with that of historical exposure events in the activity data to determine if one or more user locations are within event geographic areas of a historical exposure event.

At block 604, the system may initiate a display of a dynamic exposure map on the user mobile device. The dynamic exposure map typically comprises an overlay of at least a physical graphical element associated with the historical exposure event identified to have a similar location/event geographic areas as that of the user's current or potential future locations. In some embodiments, the dynamic exposure map may comprise an overlay of only the graphical element associated with the historical exposure event identified to have a similar location/event geographic areas as that of the user's current or potential future locations. In other embodiments, the dynamic exposure map may comprise overlays of graphical elements associated with a plurality of historical exposure events. In this regard, the system may modify the display attributes of the graphical element associated with the historical exposure event identified to have a similar location/event geographic areas as that of the user's current or potential future locations. In some embodiments, the system may initiate the display of the dynamic exposure map along with one or more auditory, vibratory and/or textual alerts described previously.

Next, the system may determine whether the user's current security features meet the escalated level of authentication required for a user activity in the predefined physical area, at block 606. In this regard, the system may determine that authentication level associated with the current/default authentication credentials of the user does not meet the escalated authentication level required for the physical area. Based on determining that (i) the user is currently in the physical area associated with a historical exposure event and/or (ii) the user's current security features do not meet the escalated level of authentication required for the predefined physical area, the system may lock/disable one or more features of the user mobile device, at block 608. The system may unlock/enable the features, automatically, in response to determining that the preceding conditions (i) and/or (ii) are no longer valid. For example, the system may freeze the display screen with a display of the dynamic exposure map, thereby prohibiting the use of the device within the unsecure area. As another example, the system may temporarily disable one or more applications/widgets on the user's mobile device and/or restrict transfer of data to and from the device. As another example, the system may limit the type of activities that may be performed using the mobile device in the physical area, by not allowing online purchases, changes in passwords/login information for applications and the device itself, installation of new applications and/or activation/deactivation of existing applications.

In some embodiments, the system may restrict user activities at the physical area associated with the historical exposure event. For instance, the system may determine that the historical exposure event at the physical area was associated with unauthorized replication of another secondary user's credit card information or double charging at a payment terminal. In this regard, the system may transmit alerts to the user, dissuading the user from performing transactions that involve display, transmission or sharing of credit card information. In this instance, the system may also create and transmit tokens or other encoded payment credentials/aliases, to the mobile device, typically for one-time use at the said physical area/transaction terminal. The user may then be enabled to use the token for a purchase within a predetermined transaction amount, based on providing alternative authentication like a fingerprint scan, which meets the escalated authentication level. The token and/or the encoded payment credential information may be transmitted to the transaction terminal via near field communication, without transmission of the actual credit card information.

The system may then determine one or more types of new security features that would meet the escalated level of authentication, at block 610. Typically, the one or more types of new security features render the user less susceptible to exposure events. For example, the system may determine that for current passcode/password security features of the user may be modified to meet the escalated level of authentication by increasing the length of the string, addition of numeric/symbolic characters at one or more locations, supplementing the passcodes with challenge questions specific to the user, limiting the time period for entering the correct passcode, and the like. As another example, the system may determine a new security feature required for a certain user activity comprising transmitting a one-time passcode to a secondary/auxiliary user device, which may be entered on the mobile device to gain access to the user activity. In this regard, the system may request the user to specify secondary user devices that may be utilized for this purpose, for example wearable devices, computing devices and the like. Therefore, the system may enable the user to modify the current security features based on the determined new security features, as illustrated by block 612. In some embodiments, the user may be enabled to modify the features only after successful validation of current security features provided by the user. In some embodiments, the system may enable the user to modify the current security features when the user is outside the predefined physical area associated with historical exposure events, when the mobile device is associated with known and secure wireless connections and/or when the user is at predetermined/known/safe locations like the user's home/office. In some embodiments, the user may be alerted/notified to modify the security features, in-real time as the user is poised to enter the predefined physical area, periodically/intermittently, at a predefined period of time prior to the user's estimated travel to the predefined physical area and the like. In some embodiments, the system may lock all functionality of the mobile device, except those that are required for the modification of the security features.

As alluded to previously, the user is typically required to authenticate their identity in order to complete a user activity (e.g., an electronic transaction). Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher confidence regarding the authentication because of the additional layer of authentication required. Therefore the second authentication is at a higher authentication level. Further, within the types of authentication, varying levels of confidence may be used. For example, when using a password, an administrator may require users to create a password according to strict rules designed to increase the security level of the password, and therefore increase the confidence/level of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities) are permitted.

Referring to FIG. 7A, a continuum of authentication 700A is illustrated according to embodiments of the invention. On the left-hand side of the continuum, a "zero authentication"/lowest level of authentication requires no authentication credentials. On the right-hand side of the continuum, a "hard authentication"/highest level of authentication requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 7C, the continuum of authentication 700A may be coupled with a functions permitted continuum 700B, first illustrated in FIG. 7B.

Referring to FIG. 7B, the functions permitted continuum 700B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 700B corresponds with a certain amount and/or number of functions that are permitted and/or the context in which certain functions are permitted.

Referring now to FIG. 7C, a diagram 700C illustrates a coupling of the functions permitted continuum 700B and the levels of authentication continuum 700A. As shown, the continua 700B and 700A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 700B provides that a particular function or functions may be permitted given that a specified level of authentication credentials are supplied, as indicated by the corresponding point on continuum 700A. For example, the system, a financial institution and/or a user may arrange the continua 700B and 700A with respect to one another and may adjust the arrangement based on changing desires or goals and situational instance with respect to historical exposure events.

In some embodiments, one or both the continua 700B and 700A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on: (i) the user network connections, (ii) the user applications, and/or (iii) the user location with respect to historical exposure events. For example, if the user is typically required to provide a username and password to complete a type of activity, but the level of authentication required is increased in accordance with block 210, then the user may be prompted to provide additional (e.g., secondary) authentication information, such as a PIN or a zip code associated with the user.

Referring now to FIG. 7D, a diagram 700D illustrates a relationship between the functions permitted and the authentication types. As shown in FIG. 7D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 6967US1.014033.2593 | 14/987,754 | SYSTEM FOR REMOTELY CONTROLLING ACCESS TO A MOBILE DEVICE | Concurrently herewith |
| 6968US1.014033.2594 | 14/987,745 | MOBILE DEVICE DATA SECURITY SYSTEM | Concurrently herewith |
| 6969US1.014033.2595 | 14/987,317 | SYSTEM FOR AUTHORIZING ACCESS BASED ON AUTHENTICATION VIA SEPARATE CHANNEL | Concurrently herewith |
| 6970US1.014033.2596 | 14/987,553 | SYSTEM FOR ESCALATING SECURITY PROTOCOL REQUIREMENTS | Concurrently herewith |

What is claimed is:

1. A system for assessing network authentication requirements based on situational instance, wherein the system provides a dynamic platform for determining authentication requirements in real-time, the system comprising:

at least one memory device;

at least one communication device connected to a distributed network;

at least one processing device communicatively coupled to the at least one memory device; and a module stored in the at least one memory device comprising executable instructions that when executed by the at least one processing device, cause the at least one processing device to:

establish a communication link with a mobile device associated with a user;

receive, from the mobile device, a request to execute a user activity, wherein the user activity requires validation of one or more authentication credentials;

monitor user network connections, user location, and user applications associated with the mobile device;

determine device information associated with the mobile device;

identify at least one local network associated with the mobile device based on the device information, wherein the mobile device is in communication with the at least one local network;

determine one or more local devices in communication with the at least one local network;

extract activity data regarding historical exposure events, wherein the activity data is received from a plurality of users associated with the historical exposure events;

compare the user network connections, the user location and the user applications with the activity data;

escalate, in real-time, a level of authentication required for the user to execute the user activity based on determining that the at least one local network and/or the one or more local devices are associated with a historical exposure event;

present the escalated authentication requirement to the user via the mobile device;

lock a display of the mobile device until (i) the user network connections, the user location and the user applications are not associated with the historical exposure event or (ii) a positive authentication response is received; and enable the user to execute the user activity based on receiving the positive authentication response.

2. The system of claim 1, wherein the module further comprises instructions that cause the at least one processing device to:

retrieve, via the communication link, application information from the mobile device;

determine one or more applications associated with the mobile device, wherein the one or more applications comprise applications stored on the mobile device, applications that are currently active and/or applications that are not currently active; and escalate the level of authentication required for the user activity based on determining that at least one of the one or more applications is associated with the historical exposure event.

3. The system of claim 1, wherein the module further comprises instructions that cause the at least one processing device to:

determine whether current user security features meet the escalated authentication requirement for the user activity;

determine one or more types of new security features that meet the escalated authentication requirement; and enable the user to modify the current user security features based on the determined new security features.

4. The system of claim 1, wherein the module further comprises instructions that cause the at least one processing device to:

establish communication links with a plurality of secondary user devices associated with a plurality of secondary users;

receive, via the communication links, activity data associated with a plurality of historical exposure events;

determine, for each historical exposure event of the plurality of historical exposure events, an event geographic area;

construct a dynamic exposure map for display on the mobile device, the map comprising geographic areas associated with the historical exposure events;

overlay, for each historical exposure event, a physical graphical element on the dynamic exposure map proximate to the event geographic area;

modify, in real-time, one or more display attributes associated with the physical graphical element based on the activity data; and initiate a presentation of the dynamic exposure map on a display associated with the mobile device.

5. The system of claim 4, wherein modifying the one or more display attributes further comprises, for each physical graphical element, modifying the physical graphical element based on a frequency of historical exposure events at the event geographic area associated with the physical graphical element, based on a type of exposure event at the event geographic area associated with the physical graphical element and/or based on a number of exposure events in a predetermined period of time preceding the current time at the event geographic area associated with the physical graphical element.

6. The system of claim 4, wherein the module further comprises instructions that cause the at least one processing device to:

determine that the user is currently proximate to the event geographic area associated with the historical exposure event;

initiate a presentation of the dynamic exposure map on the mobile device, wherein the dynamic exposure map comprises an overlay of the physical graphical element associated with the historical exposure event; and modify one or more display attributes associated with the physical graphical element.

7. A computer program product for assessing network authentication requirements based on situational instance, whereby the system provides a dynamic platform for determining authentication requirements in real-time, wherein the computer program product is embodied on a non-transitory computer-readable storage medium having computer-executable instructions to:

establish a communication link with a mobile device associated with a user;

receive, from the mobile device, a request to execute a user activity, wherein the user activity requires validation of one or more authentication credentials;

monitor user network connections, user location, and user applications associated with the mobile device;

determine device information associated with the mobile device;

identify at least one local network associated with the mobile device based on the device information, wherein the mobile device is in communication with the at least one local network;

determine one or more local devices in communication with the at least one local network;

extract activity data regarding historical exposure events, wherein the activity data is received from a plurality of users associated with the historical exposure events;

compare the user network connections, the user location and the user applications with the activity data;

escalate, in real-time, a level of authentication required for the user to execute the user activity based on determining that the at least one local network and/or the one or more local devices are associated with a historical exposure event;

present the escalated authentication requirement to the user via the mobile device;

lock a display of the mobile device until (i) the user network connections, the user location and the user applications are not associated with the historical exposure event or (ii) a positive authentication response is received; and enable the user to execute the user activity based on receiving the positive authentication response.

8. The computer program product of claim 7, wherein the non-transitory computer-readable storage medium further comprises computer-executable instructions to:

retrieve, via the communication link, application information from the mobile device;

determine one or more applications associated with the mobile device, wherein the one or more applications comprise applications stored on the mobile device, applications that are currently active and/or applications that are not currently active; and escalate the level of authentication required for the user activity based on determining that at least one of the one or more applications is associated with the historical exposure event.

9. The computer program product of claim 7, wherein the non-transitory computer-readable storage medium further comprises computer-executable instructions to:

determine whether current user security features meet the escalated authentication requirement for the user activity;

determine one or more types of new security features that meet the escalated authentication requirement; and enable the user to modify the current user security features based on the determined new security features.

10. The computer program product of claim 7, wherein the non-transitory computer-readable storage medium further comprises computer-executable instructions to:

establish communication links with a plurality of secondary user devices associated with a plurality of secondary users;

receive, via the communication links, activity data associated with a plurality of historical exposure events;

determine, for each historical exposure event of the plurality of historical exposure events, an event geographic area;

construct a dynamic exposure map for display on the mobile device, the map comprising geographic areas associated with the historical exposure events;

overlay, for each historical exposure event, a physical graphical element on the dynamic exposure map proximate to the event geographic area;
modify, in real-time, one or more display attributes associated with the physical graphical element based on the activity data; and
initiate a presentation of the dynamic exposure map on a display associated with the mobile device.

11. The computer program product of claim 10, wherein modifying the one or more display attributes further comprises, for each physical graphical element, modifying the physical graphical element based on a frequency of historical exposure events at the event geographic area associated with the physical graphical element, based on a type of exposure event at the event geographic area associated with the physical graphical element and/or based on a number of exposure events in a predetermined period of time preceding the current time at the event geographic area associated with the physical graphical element.

12. The computer program product of claim 10, wherein the non-transitory computer-readable storage medium further comprises computer-executable instructions to:
determine that the user is currently proximate to the event geographic area associated with the historical exposure event;
initiate a presentation of the dynamic exposure map on the mobile device, wherein the dynamic exposure map comprises an overlay of the physical graphical element associated with the historical exposure event; and
modify one or more display attributes associated with the physical graphical element.

13. A method for assessing network authentication requirements based on situational instance, whereby the system provides a dynamic platform for determining authentication requirements in real-time, comprising:
establishing, by a computing device, a communication link with a mobile device associated with a user;
receiving, by the computing device, from the mobile device, a request to execute a user activity, wherein the user activity requires validation of one or more authentication credentials;
monitoring, by the computing device, user network connections, user location, and user applications associated with the mobile device;
determining, by the computing device, device information associated with the mobile device;
identifying, by the computing device, at least one local network associated with the mobile device based on the device information, wherein the mobile device is in communication with the at least one local network;
determining, by the computing device, one or more local devices in communication with the at least one local network;
extracting, by the computing device, activity data regarding historical exposure events, wherein the activity data is received from a plurality of users associated with the historical exposure events;
comparing, by the computing device, the user network connections, the user location and the user applications with the activity data;
escalating, by the computing device, in real-time, a level of authentication required for the user to execute the user activity based on determining that the at least one local network and/or the one or more local devices are associated with a historical exposure event;
presenting, by the computing device, the escalated authentication requirement to the user via the mobile device;
locking, by the computing device, a display of the mobile device until (i) the user network connections, the user location and the user applications are not associated with the historical exposure event or (ii) a positive authentication response is received; and
enabling, by the computing device, the user to execute the user activity based on receiving the positive authentication response.

14. The method of claim 13, further comprising:
retrieving, via the communication link, application information from the mobile device;
determining one or more applications associated with the mobile device, wherein the one or more applications comprise applications stored on the mobile device, applications that are currently active and/or applications that are not currently active; and
escalating the level of authentication required for the user activity based on determining that at least one of the one or more applications is associated with the historical exposure event.

15. The method of claim 13, further comprising:
establishing communication links with a plurality of secondary user devices associated with a plurality of secondary users;
receiving, via the communication links, activity data associated with a plurality of historical exposure events;
determining, for each historical exposure event of the plurality of historical exposure events, an event geographic area;
constructing a dynamic exposure map for display on the mobile device, the map comprising geographic areas associated with the historical exposure events;
overlaying, for each historical exposure event, a physical graphical element on the dynamic exposure map proximate to the event geographic area;
modifying, in real-time, one or more display attributes associated with the physical graphical element based on the activity data; and
initiating a presentation of the dynamic exposure map on a display associated with the mobile device.

16. The method of claim 15, wherein modifying the one or more display attributes further comprises, for each physical graphical element, modifying the physical graphical element based on a frequency of historical exposure events at the event geographic area associated with the physical graphical element, based on a type of exposure event at the event geographic area associated with the physical graphical element and/or based on a number of exposure events in a predetermined period of time preceding the current time at the event geographic area associated with the physical graphical element.

17. The method of claim 15, comprising:
determining that the user is currently proximate to the event geographic area associated with the historical exposure event;
initiating a presentation of the dynamic exposure map on the mobile device, wherein the dynamic exposure map comprises an overlay of the physical graphical element associated with the historical exposure event; and
modifying one or more display attributes associated with the physical graphical element.

18. The method of claim 13, comprising:
determining whether current user security features meet the escalated authentication requirement for the user activity;
determining one or more types of new security features that meet the escalated authentication requirement; and
enabling the user to modify the current user security features based on the determined new security features.

* * * * *